Aug. 15, 1933.　　　M. K. McCOSH　　　1,922,549

VEHICLE JACK

Filed Dec. 5, 1930

Inventor

Marshall K. McCosh

By E. Walton Brewington

Attorney

Patented Aug. 15, 1933

1,922,549

UNITED STATES PATENT OFFICE 1,922,549

VEHICLE JACK

Marshall K. McCosh, Reisterstown, Md.

Application December 5, 1930. Serial No. 500,228

11 Claims. (Cl. 254—88)

This invention relates to vehicle jacks and has special reference to a vehicle jack on which a wheel of the vehicle is run to elevate such wheel and the portion of the vehicle associated therewith.

One important object of the invention is to provide an improved general construction of jacks of this type.

A second important object of the invention is to provide an improved form of base or body for such a jack.

A third important object of the invention is to provide an improved arrangement of floor or ground tread in connection with the jack body.

A fourth important object of the invention is to provide an improved arrangement of wheel elevating tread in connection with such a body.

With the above and other objects in view, the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1:
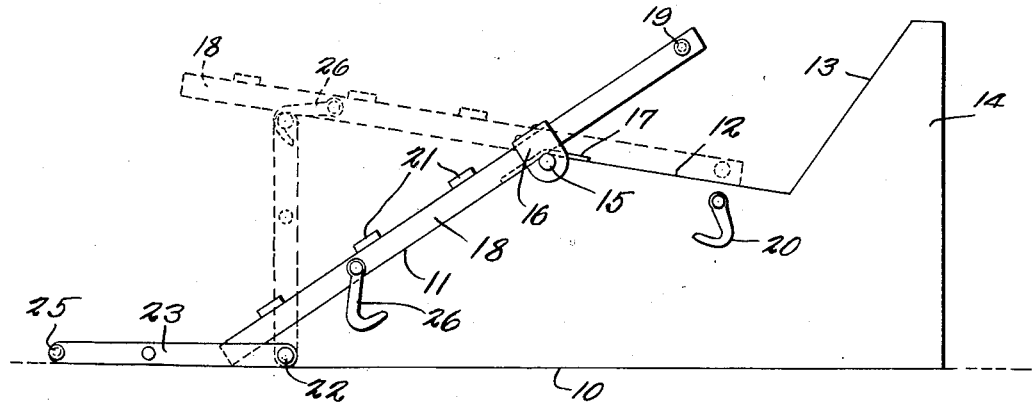
Figure 1 is a side elevation of one preferred form of the invention.
Figure 2:
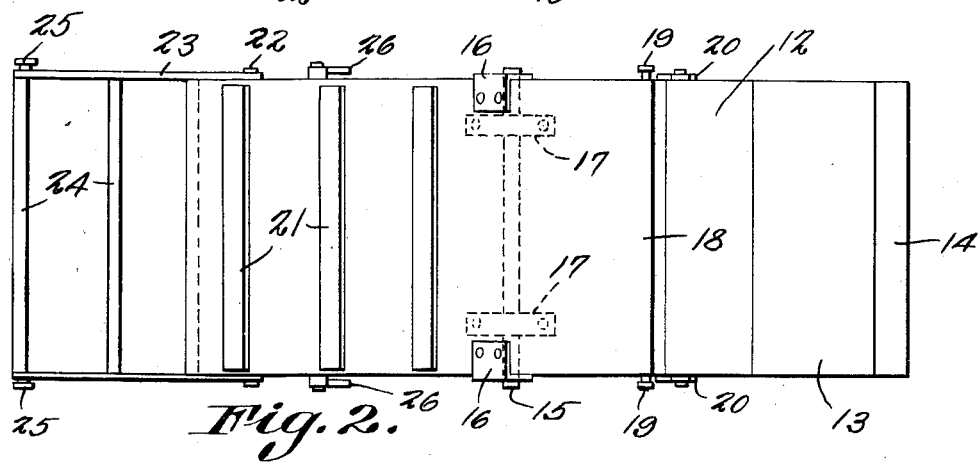
Figure 2 is a plan view thereof.

In the form of the invention shown in Figures 1 and 2 there is provided a base or body of elongated rectangular form in plan and this body has a flat bottom surface 10 for resting the device on a floor or the ground. At what may be termed the rear end of the jack there is provided an inclined face 11 which extends upwardly and forwardly from the rear edge of the base 10. From the forward edge of this surface there extends forwardly a downwardly inclined surface 12. From the forward edge of the surface 12 extends an upwardly and forwardly inclined stop surface 13 forming the rear face of a stop wall 14 projecting upwardly at the forward end of the body.

Extending across the body at the angle between the surfaces 11 and 12 is a rod or shaft 15 the ends of which project beyond the sides of the body and carry the angle brackets 16. Straps 17 hold the rod 15 in place. A platform 18 is carried by the brackets and is arranged to swing between a position with its rear end resting on the surface 11 and a position with its front end resting on the surface 12, the brackets being attached to the platform between its ends. Projecting laterally from the forward end of the platform are lugs 19 which overhang the sides of the body for engagement by hooks 20 pivoted to the body sides. Cleats 21 are arranged across the rear end of the platform to give better traction to a wheel ascending the jack upon the platform being in inclined position. At the rear bottom end of the body are lateral pivot lugs 22 whereon are hinged bars 23 connected by cleats 24. Normally this device, which I term a floor-plate, lies flat on the floor or ground but it is provided at its free rear end with laterally projecting lugs 25 adapted for engagement by the hooks 26, which are pivoted to the platform 18 adjacent its rear end, when the platform is raised in use as shown in dotted lines in Figure 1. Under these conditions the floor-plate acts as a strut to support the rear end of the platform 18. This floor-plate is claimed as my invention in my application, Serial No. 487,018, filed October 7, 1930. The construction shown herewith, however, affords better traction to a wheel than the flat plate construction shown in my previous application.

In use the parts are arranged as in full lines in Figure 1 and the jack placed adjacent a vehicle wheel. The vehicle is then moved to run the wheel onto the floor plate and from thence up the platform till the upper or forward end of the platform drops and the platform assumes the dotted line position and the wheel comes in contact with the stop surface 13. The traction rack is now raised to support the rear end of the platform and the hooks 20 and 26 are engaged with the lugs 19 and 25 to hold the parts in dotted line positions.

There has thus been provided a simple and efficient device of the kind described and for the purpose specified.

It is obvious that minor changes may be made in the form and construction of the device without departing from the principles involved. It is therefore desired to include, as the invention, all forms which properly come within the scope claimed.

Having thus described the invention, what is claimed is:—

1. A wheel jack having a body provided at its rear end with an upwardly inclined forwardly extending ramp face and at its forward end with an upstanding stop wall, said body also having a wheel supporting face between the inclined face and stop wall, and a platform pivoted between its ends to the body at the upper end of the inclined face and adapted to have its rear end rest on the inclined face in one position and its front end rest on the wheel supporting face in a second position.

2. A wheel jack having a body provided at its rear end with an upwardly inclined forwardly extending ramp face and at its forward end with an upstanding stop wall, said body also having a wheel supporting face between the inclined face and stop wall, a platform pivoted between its ends to the body at the upper end of the inclined face and adapted to have its rear end rest on the inclined face in one position and its front end rest on the wheel supporting face in a second position, and means to secure the platform in the last mentioned position.

3. A wheel jack having a body provided at its rear end with an upwardly inclined forwardly extending ramp face and at its forward end with an upstanding stop wall, said body also having a wheel supporting face between the inclined face and stop wall, a platform pivoted between its ends to the body at the upper end of the inclined face and adapted to have its rear end rest on the inclined face in one position and its front end rest on the wheel supporting face in a second position, and a floor-plate pivoted at one end to the lower rear end of the body to lie flat on a jack supporting surface and to be positioned upright beneath the rear end of the platform to hold the same raised.

4. A wheel jack having a body provided at its rear end with an upwardly inclined forwardly extending ramp face and at its forward end with an upstanding stop wall, said body also having a wheel supporting face between the inclined face and stop wall, a platform pivoted between its ends to the body at the upper end of the inclined face and adapted to have its rear end rest on the inclined face in one position and its front end rest on the wheel supporting face in a second position, a floor plate pivoted at one end to the lower rear end of the body to lie flat on a jack supporting surface and to be positioned upright beneath the rear end of the platform to hold the same raised, and means to secure the platform and floor-plate releasably together with the rear end of the platform raised.

5. A wheel jack having a body provided at its rear end with an upwardly inclined forwardly extending ramp face and at its forward end with an upstanding stop wall, said body also having a wheel supporting face between the inclined face and stop wall, a platform pivoted between its ends to the body at the upper end of the inclined face and adapted to have its rear end rest on the inclined face in one position and its front end rest on the wheel supporting face in a second position, a floor-plate pivoted at one end to the lower rear end of the body to lie flat on a jack supporting surface and to be positioned upright beneath the rear end of the platform to hold the same raised, means to secure the platform and floor-plate releasably together with the rear end of the platform raised, and other means to hold the forward end of the platform releasably down on the wheel supporting face.

6. A vehicle jack comprising a body having an inclined face, a wheel-stop, an elevated face between said inclined face and said wheel-stop, said elevated face being inclined downwardly towards said wheel-stop, and a tilting runway adapted to be in contact with said inclined face when said runway is in one position and to be in contact with said elevated face in another position.

7. A vehicle jack comprising a body having an elevated face inclined downwardly and forwardly, a wheel-stop mounted at the forward part of said body, and a tilting runway mounted on said body and adapted to tilt rearwardly toward the jack-supporting surface to receive or discharge a vehicle wheel and to tilt forwardly toward the jack-supporting surface when a vehicle wheel has moved upon it to its forward part and in said forwardly tilting position to be in contact with said elevated face.

8. In combination; a vehicle jack as set forth in claim 6, and a floor-plate attached to said jack.

9. In combination; a vehicle jack as set forth in claim 6, and a floor-plate movably attached to said jack and adapted to be positioned to hold the tilting runway of said jack in the position said tilting runway assumes when it is in contact with the elevated face of said jack.

10. In combination; a vehicle jack as set forth in claim 6, and means for holding the tilting runway of said jack in the position said tilting runway assumes when it is in contact with the elevated face of said jack.

11. A vehicle jack comprising a body, a wheel-stop mounted at the forward part of said body, and a tilting platform mounted on said body and adapted to tilt rearwardly toward the jack-supporting surface to receive or discharge a vehicle wheel and to tilt forwardly toward the jack-supporting surface when a vehicle wheel has moved upon it to its forward part and in said forwardly tilting position to be in contact with platform-stopping means, said body having said platform-stopping means adapted to stop the tilting movement of said platform forwardly toward the jack-supporting surface.

MARSHALL K. McCOSH.